Patented July 21, 1936

2,048,303

UNITED STATES PATENT OFFICE 2,048,303

POLISH

Milton D. Swartz, Baltimore, Md.

No Drawing. Application December 30, 1931,
Serial No. 584,013

18 Claims. (Cl. 134—24)

The present invention is directed to the production of a substantially rubless polish which is free from greasiness or stickiness on application to an article, and yields a durable shiny surface which does not require buffing or polishing to obtain a gloss.

The polish broadly comprises a wax emulsion carrying wax permanently dispersed therein in a finely divided condition, and a gum or resin solution soluble in water, in an alkali solution, or inorganic solvents, the gum solution being also dispersed in the wax emulsion and characterized by the property of being incapable of breaking the wax emulsion. When the resin is dissolved in an organic solvent instead of water, any of the prior art solvents may be employed, and as an example thereof mention may be made of petroleum solvents such as gasoline, coal tar solvents, and particularly benzol and turpentine.

Broadly stated, the present invention is directed to a polish composition free from greasiness and requiring upon application to a surface little buffing or polishing to yield on drying a durable glossy coating, the polish comprising a wax emulsion having its wax component permanently dispersed therein in a finely divided condition, and carrying a resin component incapable of breaking down the wax emulsion. The resin component is preferably a resin compound having a volatile radical capable of evaporation as the polish dries. Ammonium resinate is an example of a suitable resin component having a volatile radical. Other volatile radicals may be substituted for the ammonium radical. While it is preferable that the volatile radical be an inorganic radical, this is not essential as the resin may be dissolved in organic solvent and the organic solvent will evaporate on drying.

The process of the present invention broadly comprises forming an aqueous mixture of wax, soap, a secondary emulsifying agent and an agent adapted to lower the surface tension of the aqueous solution, heating the mixture, treating the mixture to form a stable emulsion containing finely divided wax permanently dispersed in the emulsion, and adding thereto a resin component incapable of breaking down the emulsion. In the preferred form the wax emulsion is dehydrated and then again emulsified, and there may be several emulsifying and dehydrating steps.

The wax emulsion is preferably made as follows: wax is mixed with commercially dry soap, and water is added thereto. It is desirable to add to the mixture a small amount of a compound which will accelerate the solution of the soap and the water or, stated differently, which will lower the surface tension of the emulsion, and for this purpose alcohol gives the most satisfactory result. The alcohol also acts as an organic dispersion medium, and is to be considered merely representative of such agents, as others, while not giving quite as satisfactory results, may be used. For example, instead of using methyl alcohol or butyl alcohol, turpentine, benzol and other coal tar solvents may be used. It has been ascertained that the formation of the wax emulsion functions better when sulphonated castor oil or Turkey red oil is added to the mixture, agents of this character, apparently acting to accelerate the emulsification. Sulphonated cast or oil may be considered representative of a sulphonated emulsifying agent. However, the invention is not limited to the use of this particular secondary emulsifying agent, as other vegetable and mineral oils may be used, although the results are not as satisfactory. While in the preferred form of the invention an organic surface tension dispersing agent, and particularly an alcohol, a secondary emulsifying agent and particularly sulphonated castor oil is used in the production of the wax emulsion, and these give the best and most satisfactory results, it is to be understood the wax emulsion may be formed without utilizing such agents.

While the preferred wax is carnauba wax, other waxes may be used, for example, palm nut wax, walnut wax, beeswax, ozokerite, and Montan wax. High melting point paraffin wax may also be used, but in general it does not give very satisfactory results. Broadly, the wax emulsion may be formed utilizing any hard or semi-hard vegetable or mineral wax.

While broadly any water soluble soap may be used to form the emulsion, castile soap is preferred, as it is very uniform in character and this is important, since extensive experiments show that unless the emulifying agent is uniform in character the resulting emulsion may be substantially worthless as far as utilization for polish purposes is concerned. Ammonium stearate and ammonium linoleate have proven eminently desirable for emulsifying purposes since the ammonia radical may be easily volatilized therefrom. Alkali stearates, linoleates, and palmitates, such as sodium or potassium linoleate and sodium or potassium stearates may be used, but the sodium and potassium radicals remain in the final polish, and tend to make it somewhat hygroscopic.

In the preferred form of the invention, a mixture of wax, alcohol, sulphonated castor oil, and water is heated in a steam jacketed kettle, the steam being preferably at a pressure of 65 to 70 pounds per square inch, corresponding to a temperature of about 300° F. or 150° C.

An example of a suitable mixture is:

| | Pounds |
|---|---|
| Carnauba wax | 26 |
| Castile soap | 6.5 |
| 75% sulphonated castor oil | 2.1 |
| 94% alcohol (C. D. No. 1) | 3.4 |
| Water 3 gal., about | 25 |

The mixture containing the melted wax is agitated in the kettle under the influence of heat until the melted batch is practically free of water, or is dehydrated. Using a temperature of about 150° C., this will take place fairly rapidly; the time, of course, depending on the amount of material treated and the temperature employed. The progress of the dehydration may be determined by the clarity of the batch being treated, as the latter remains cloudy until the last appreciable amount of water has been evaporated. The resulting wax mixture is a clear wax solution. At this stage of the process there is added to the clear hot wax batch about two gallons of water at or near the boiling point thereof, for example 95° C., and the wax mass is again preferably dehydrated, it being constantly agitated during the dehydration step. To the clear dehydrated wax mass there is added one gallon of boiling water and again the mass is preferably dehydrated.

Each time the mass is emulsified after dehydration, the entire amount of water being added suddenly and quickly to the liquid wax batch. The hot water suddenly contacting with the liquid wax at a temperature of about 150° C. functions to disperse the wax in a finely divided condition. This temperature is of course merely the preferred one and may be considerably varied, it being only essential that the wax be liquid or above its melting point. The temperature of the water can also vary above and below its boiling point.

While repeated dehydration and emulsifying steps are desirable and give the best results, a single dehydration step followed by an emulsifying step may be used. If a single dehydration step or several dehydration steps are used, the final emulsification is effected by adding to the dehydrated clear liquid wax a large amount of boiling water. In the example given, about 32 gallons are added, stirring vigorously during the addition. When the wax emulsion begins to boil and foam, it is immediately discharged and allowed to cool to room temperature. The entire amount of water is added suddenly and quickly to the melted dehydrated wax batch to break up the mass of the latter, the hot water suddenly contacting with the melted batch at a much higher temperature functioning to disperse the wax in a finely divided condition so that it functions satisfactorily in the polish.

Preferably the clear hot liquid wax from which the final emulsion is made is permitted to cool somewhat prior to being treated with boiling water, the cooling step being desirable to prevent the boiling water from causing the contents of the kettle from boiling over. For example, if the melted dehydrated wax batch is at a temperature of 150° C., it is permitted to cool to about 125° C. before the 32 gallons of water are added. The invention is not limited to these temperatures as they, of course, may be varied.

Water is the preferred dispersion agent and gives the most satisfactory results. However, emulsions may be made by dispersing the wax in other dispersion mediums which will emulsify and which may be volatilized from the finished polish when the latter dries on application to a surface.

The wax emulsion produced as set forth has added thereto a resin solution. This resin solution may be prepared in a number of ways, but is preferably prepared as follows:

4.1 lbs. dewaxed orange shellac is added to about 4 gallons of boiling water to which there has been added 2.1 lbs. 26° Bé. ammonium hydroxide. The ammonium hydroxide solution dissolves the dewaxed shellac, and the mixture is then introduced into a steam jacketed kettle and heated to a suitable temperature to produce a clear solution. For example, satisfactory results have been produced by varying the temperature between 60° C. and 100° C. Thereafter, the shellac solution is allowed to cool to room temperature.

The solution containing the resinate is added to the wax emulsion produced as set forth, thereby forming the finished rubless polish containing wax finely and permanently dispersed in an aqueous medium having a resin constituent.

It may be pointed out that broadly as a solvent for resin any alkali-water combination may be used. Specifically, resin may be dissolved in sodium carbonate, sodium hydroxide, potassium hydroxide, sodium borate, and other inorganic solvents. However, it is desired to distinctly point out that there is a very substantial advantage in using ammonia to dissolve the resin, since when the liquid mixture is applied to a surface, the ammonia evaporates with the water and leaves a very insoluble residue. In the case where alkali compounds such as sodium or potassium salts or the like are used to dissolve the resin, when the final emulsion containing the same is applied to a surface, the sodium or potassium constituents attract water and so prevent the formation of a homogeneous and insoluble coating of polish. In many cases, when the sodium or potassium resinates are added to the emulsion, the final polish when applied to the surface forms specks. The above can better be brought out by stating that the ammonia evaporates and leaves the resin in an insoluble state. The same desirable property in the finished polish can be obtained by dissolving the resin in organic solvents such as turpentine, benzol, petroleum solvents and the like, or the organic solvents may be used, together with water, the latter forming an aqueous dispersion. In other words, the resin dissolved in the organic solvent is colloidally dispersed in the water, the latter acting as a dispersion agent. The organic solvent is preferably one which is volatile, and therefore when the polish containing the same is applied to a surface, a homogeneous non-hygroscopic permanent surface is obtained. The resin constituent may also be dissolved in any of the aqueous ethanolamines, but preferably triethanolamine. Ammonium hydroxide is, however, the preferred solvent for the resin, giving the best results.

While the preferred resin is shellac which is desirably, although not necessarily, dewaxed, other resins may be used, for example, rosin, elemi gum, ester gum. The resin need not be one that occurs naturally, as synthetic resins may also be used.

While it is preferred to add about 8 to 10% of the resin solution to 92 to 90% of the wax emulsion prepared as above set forth, these proportions may be greatly varied. For example, the final polish may have merely one-half of 1% of the resin solution and the balance wax emulsion. The resin solution present may be progressively increased. For example, the polish may contain 15% of the resin solution and 85% wax emulsion. In other words, as the percentage of resin solution is progressively increased, the percentage of wax solution present in the mixture is progressively decreased. Stated differently, the proportion of resin solution in the final polish may vary from ½% to 95%, and the balance wax emulsion.

The following is an example of the preferred proportion of ingredients present in the wax solution and in the resin solution and the variable range of each constituent:

*Wax emulsion*

|  | Variable range | Proportion preferred |
|---|---|---|
|  | Percent | Percent |
| Wax | 3 to 30 | 8.7 |
| Soap | 1.5 to 10 | 2.2 |
| Sulp. castor oil | 0 to 5 | 0.7 |
| Alcohol | 0 to 5 | 0.5 |
| Water | 50 to 95 | 87.9 |

*Resin solution*

|  | Variable range | Proportion preferred |
|---|---|---|
|  | Percent | Percent |
| Resin | ½ to 60 | 11.3 |
| Ammonia | 2 to 20 | 5.5 |
| Water | 20 to 98 | 83.2 |

In making the original wax emulsion the preferred percentage of ingredients may be as follows:

| | Pounds |
|---|---|
| Carnauba wax | 26 |
| Castile soap or its equivalent | 6.5 |
| Sulphonated castor oil | 2.1 |
| Alcohol | 3.4 |
| Water, about 3 gallons | about 25 |

It is of course obvious that the invention is not limited to the precise amount of percentages given. In general, the carnauba wax present may be varied between 10 and 50 lbs.; the castile soap between 5 and 20 lbs.; the sulphonated castor oil may be varied between 0 to 12 lbs.; and the alcohol may be varied between 0 to 10 lbs.

The resin solution is preferably made by dissolving 4½ lbs. of the dewaxed shellac in 4 gallons of water, containing 2½ lbs. of 26° Bé. ammonium hydroxide. However, the shellac may vary from ½ to 25 lbs., and the amount of the ammonium hydroxide may vary between ½ and 20 lbs.

The amount of water used in the specific examples given is preferably about 350 lbs. This however may vary between 200 to 5,000 lbs.

A rubless polish may also be produced by mixing water, soap, wax, a resin, and a solvent of the resin, heating the batch, and then agitating with steam for an appropriate length of time. This produces an emulsion in which the wax and resin solution are dispersed in water. While the results of such process are fair, the procedure herein previously set forth is more satisfactory, and is therefore preferred.

The term "resin component" as used in the claims covers natural and synthetic resins, and includes rosin or its derivatives and compounds.

The polish herein described is especially adapted for polishing floors and furniture. Not only may it be used for polishing wooden objects, but it is also adapted for the polishing of metal objects and especially those carrying an enamel or lacquer surface, such as automobiles and metal furniture.

What I claim is:

1. The process of making a polish comprising forming an aqueous mixture of a non-sticky and non-greasy wax, soap, a secondary emulsifying agent, and an agent adapted to lower the surface tension of the aqueous solution, heating the mixture, treating the mixture to form a stable emulsion containing finely divided wax permanently dispersed therein, and incorporating therein a resin component having a volatile radical incapable of breaking down the wax emulsion and drying to a glossy finish.

2. The process of making a polish comprising forming an aqueous mixture of non-sticky and non-greasy wax, soap, a secondary emulsifying agent, and an agent adapted to lower the surface tension of the aqueous solution, heating the mixture, treating the mixture to form a stable emulsion containing finely divided wax permanently dispersed therein, and incorporating therein an ammonia solution of a resin incapable of breaking down the emulsion drying to a glossy finish.

3. The process of making a polish comprising forming an aqueous mixture of non-sticky and non-greasy wax and ammonium soap, a secondary emulsifying agent and an agent adapted to lower the surface tension of the aqueous solution, heating the mixture, treating the mixture to form a stable emulsion containing finely divided wax permanently dispersed therein, and incorporating therein a resin component containing a volatile radical and incapable of breaking down the emulsion and drying to a glossy finish.

4. The process of making a polish comprising forming an aqueous mixture of non-sticky and non-greasy wax, soap, sulphonated castor oil and alcohol, heating the mixture, treating the mixture to form a stable emulsion containing finely divided wax permanently dispersed therein, and incorporating therein a resin compound containing a volatile radical and incapable of breaking down the emulsion and drying to a glossy finish.

5. The process of making a polish comprising forming an aqueous mixture of non-sticky and non-greasy wax, sulphonated castor oil and alcohol, heating the mixture, treating the mixture to form a stable emulsion containing finely divided wax permanently dispersed therein, and incorporating therein a resin component having a volatile radical incapable of breaking down the wax emulsion and drying to a glossy finish.

6. The process of making a polish comprising forming an aqueous mixture of non-sticky and non-greasy wax, soap, sulphonated castor oil and alcohol, heating the mixture, treating the mixture to form a stable emulsion containing finely divided wax permanently dispersed therein, and incorporating therein an ammonia solution of a resin incapable of breaking down the emulsion and drying to a glossy finish.

7. The process of making a polish composition comprising heating non-sticky and non-greasy wax, water, and an emulsifying agent to form a wax emulsion, dehydrating the emulsion to form clear, hot, liquid wax, rapidly introducing into the hot liquid wax a dispersion medium to permanently disperse the wax therein in a finely divided condition, and incorporating in the resulting wax emulsion a resin component containing a volatile radical and incapable of breaking down the emulsion and drying to a glossy finish.

8. The process of making a polish composition comprising heating a non-sticky and non-greasy wax, water and an emulsifying agent to form a wax emulsion, dehydrating the emulsion to form a clear, hot, liquid wax, repeating the emulsifying and dehydrating steps until a final emulsion is obtained carrying finely divided wax permanently dispersed therein, cooling the wax emulsion and incorporating in the final emulsion a resin component containing a volatile radical and incapable of breaking down the emulsion and drying to a glossy finish.

9. The process of making a polish composition comprising mixing non-sticky and non-greasy wax, water, soap, sulphonated castor oil, and alcohol, heating the mixture to form an emulsion, dehydrating the latter to form a clear hot liquid wax, and rapidly introducing into the hot liquid wax a dispersion medium to permanently disperse the wax therein in a finely divided condition, cooling and incorporating in the resulting cool wax emulsion a resin component containing a volatile radical and incapable of breaking down the emulsion and drying to a glossy finish.

10. The process of making a polish composition comprising mixing non-sticky and non-greasy wax, water, an ammonium soap, sulphonated castor oil, and alcohol, heating the mixture to form an emulsion, dehydrating the latter to form a clear, hot, liquid wax, and rapidly introducing with the hot liquid wax a dispersion medium to permanently disperse the wax therein in a finely divided condition, cooling and incorporating in the resulting cool wax emulsion a resin component containing a volatile radical and incapable of breaking down the emulsion and drying to a glossy finish.

11. The process of making a polish composition comprising heating non-sticky and non-greasy wax, water, soap, sulphonated castor oil to form a wax emulsion, dehydrating the emulsion to form a clear hot liquid wax, repeating the emulsifying and dehydrating steps until a final emulsion is obtained carrying finely divided wax permanently dispersed therein, cooling and incorporating in the final cool emulsion a resin component containing a volatile radical and incapable of breaking down the emulsion and drying to a glossy finish.

12. The process of making a polish composition comprising heating non-sticky and non-greasy wax, water, and an emulsifying agent to form an emulsion, dehydrating the emulsion to form a clear, hot, liquid wax mass, rapidly and suddenly introducing into the hot liquid mass hot water which on contact with the melted mass permanently disperses the same in the water in a finely divided condition, cooling and incorporating in the final wax emulsion a resin component containing a volatile radical and incapable of breaking down the emulsion and drying to a glossy finish.

13. The process of making a polish composition comprising heating non-sticky and non-greasy wax, water, and an emulsifying agent to form an emulsion, dehydrating the emulsion to form a clear, hot, liquid wax mass, rapidly and suddenly introducing into the hot liquid mass hot water which on contact with the melted mass permanently disperses the same in the water in a finely divided condition, cooling and incorporating in the resulting cool emulsion an ammonia solution of a resin incapable of breaking down the emulsion and drying to a glossy finish.

14. A non-sticky polish composition free from greasiness comprising a wax emulsion having a non-sticky and non-greasy wax component permanently dispersed therein in a finely divided condition and carrying dispersed therein a resin compound incapable of breaking down the wax emulsion, characterized by the property of non-stickiness on exposure to the atmosphere, and having a volatile radical, said polish upon application to a surface being characterized by the property of drying on evaporation of the volatile resin radical to a non-sticky durable glossy finish.

15. A non-sticky polish composition free from greasiness comprising a wax emulsion having a non-sticky and non-greasy wax component permanently dispersed therein in a finely divided condition and carrying an ammonium solution of a resin incapable of breaking down the wax emulsion, and drying to a non-sticky condition on exposure to the atmosphere, said polish upon application to a surface being characterized by the property of drying on evaporation of the volatile radical of the resin to a durable glossy finish.

16. A non-sticky polish composition free from greasiness comprising a non-sticky and non-greasy wax component permanently dispersed therein in a finely divided condition and carrying a resin component dissolved in an aqueous solution of triethanol amine and incapable of breaking down the wax emulsion, said polish upon application to a surface being characterized by the property of drying to a non-sticky durable glossy finish.

17. A non-sticky polish composition free from greasiness comprising an aqueous dispersion of a non-sticky and non-greasy wax in a finely divided condition and an ammonia solution of a shellac, said polish upon application to a surface being characterized by the property of drying to a non-sticky durable glossy finish.

18. The process of making a polish comprising forming an aqueous dispersion of non-sticky and non-greasy wax in a finely divided condition, cooling the aqueous dispersion, forming a resin solution having a volatile radical, cooling the resin solution, and incorporating said resin solution in the cool aqueous wax dispersion, said mixture upon application to a surface forming a durable glossy coating.

MILTON D. SWARTZ.